(12) United States Patent
Heikkila et al.

(10) Patent No.: US 6,649,066 B2  
(45) Date of Patent: *Nov. 18, 2003

(54) METHOD FOR THE FRACTIONATION OF MOLASSES

(75) Inventors: Heikki Heikkila, Espoo (FI); Göran Hyöky, Kantvik (FI); Jarmo Kuisma, Kantvik (FI)

(73) Assignee: Danisco Finland Oy, Espoo (FI)

(*) Notice: Subject to any disclaimer, the term of this patent is extended or adjusted under 35 U.S.C. 154(b) by 0 days.

This patent is subject to a terminal disclaimer.

(21) Appl. No.: 09/736,071

(22) Filed: Dec. 13, 2000

(65) Prior Publication Data

US 2001/0000401 A1 Apr. 26, 2001

Related U.S. Application Data

(63) Continuation of application No. 09/374,582, filed on Aug. 13, 1999, now Pat. No. 6,187,204, which is a continuation of application No. 08/925,903, filed on Sep. 9, 1997, now Pat. No. 6,093,326, which is a continuation of application No. 08/541,568, filed on Oct. 10, 1995, now abandoned, which is a continuation of application No. 08/187,421, filed on Jan. 25, 1994, now abandoned.

(30) Foreign Application Priority Data

Jan. 26, 1993 (FI) .................................................. 930321

(51) Int. Cl.[7] .............................................. B01D 15/08
(52) U.S. Cl. .................. 210/659; 210/198.2; 127/46.2; 127/46.3
(58) Field of Search ................................. 210/635, 656, 210/659, 198.2; 127/46.2, 46.3, 55

(56) References Cited

U.S. PATENT DOCUMENTS

| | | | |
|---|---|---|---|
| 2,007,971 A | 7/1935 | Jackson | 127/58 |
| 2,375,165 A | 5/1945 | Nees et al. | 260/534 |
| 2,519,573 A | 8/1950 | Hoglan | 260/501 |
| 2,524,414 A | 10/1950 | Wolfrom et al. | 127/55 |

(List continued on next page.)

FOREIGN PATENT DOCUMENTS

| | | | |
|---|---|---|---|
| CA | 754511 | 3/1967 | |
| DE | 2 300 492 | 7/1973 | 210/659 |
| DE | 23 62 211 | 6/1975 | 210/659 |

(List continued on next page.)

OTHER PUBLICATIONS

Minute order and Memorandum Opinion and Order (Mar. 26, 2002) pp. 1–18.

"*Making Waves In Liquid Processing—Advanced Technology In Liquid Process*" Illinois Water Treatment Company, published by *New Technology: IWT ADSEP™ System*, vol. 1 NC, Mar. 4, 1983, A24115–A24116.

Memorandum Opinion and Order (Dec. 23, 2002), pp. 1–18.

Defendants' Reply in Support of Their Motion for Summary Judgment for Invalidity of the '398 Patent Under the §102(b) On Sale Bar. (Jan. 10, 2000).

(List continued on next page.)

*Primary Examiner*—Ernest G. Therkorn  
(74) *Attorney, Agent, or Firm*—Kenyon & Kenyon

(57) ABSTRACT

The invention relates to a method for the fractionation of molasses using a chromatographic simulated moving bed system in which the liquid flow is effected in a single direction in a system comprising at least two chromatographic partial packing material beds. In the method of the invention, the product or products are recovered during a multi-step sequence comprising the following phases: feeding phase of molasses, eluting phase and recycling phase. The liquid present in the partial packing material beds with their dry solids profile is recycled in the recycling phase in a loop comprising one, two or several partial packing material, beds.

68 Claims, 4 Drawing Sheets

U.S. PATENT DOCUMENTS

| | | | |
|---|---|---|---|
| 2,586,295 A | 2/1952 | Brown et al. | 260/501 |
| 2,588,449 A | 3/1952 | Young et al. | 127/30 |
| 2,818,851 A | 1/1958 | Khym et al. | 127/55 |
| 2,845,136 A | 7/1958 | Robinson | 183/2 |
| 2,868,677 A | 1/1959 | Kopke | 127/46 |
| 2,890,972 A | 6/1959 | Wheaton | 127/46 |
| 2,937,959 A | 5/1960 | Reents et al. | 127/46 |
| 2,949,389 A | 8/1960 | Murtaugh et al. | 127/36 |
| 3,021,374 A | 2/1962 | Radzitzky | 260/631 |
| 3,044,904 A | 7/1962 | Serbia | 127/46 |
| 3,044,905 A | 7/1962 | Lefevre | 127/46 |
| 3,044,906 A | 7/1962 | Lefevre | 127/46 |
| 3,134,814 A | 5/1964 | Sargent et al. | 260/583 |
| 3,174,876 A | 3/1965 | Stark | 127/46 |
| 3,214,293 A | 10/1965 | Mountfort | 127/9 |
| 3,230,167 A | 1/1966 | Golay | 310/31 |
| 3,250,058 A | 5/1966 | Baddour et al. | 55/67 |
| 3,268,605 A | 8/1966 | Boyd, Jr. | 260/666 |
| 3,298,527 A | 1/1967 | Wright | 210/198 |
| 3,305,395 A | 2/1967 | Scallet et al. | 127/30 |
| 3,374,606 A | 3/1968 | Baddour | 55/67 |
| 3,398,512 A | 8/1968 | Perkins, Jr. et al. | 55/386 |
| 3,407,574 A | 10/1968 | Perkins, Jr. et al. | 55/386 |
| 3,411,342 A | 11/1968 | Liermann | 73/53 |
| 3,416,961 A | 12/1968 | Mountfort et al. | 127/46 |
| 3,420,709 A | 1/1969 | Barrett, Jr. et al. | 127/53 |
| 3,436,897 A | 4/1969 | Crowley | 55/67 |
| 3,453,811 A | 7/1969 | Crowley | 55/386 |
| 3,468,607 A | 9/1969 | Sloane et al. | 356/73 |
| 3,471,329 A | 10/1969 | Quietensky et al. | 127/46 |
| 3,474,908 A | 10/1969 | Catravas | 210/198 |
| 3,479,248 A | 11/1969 | Nobile | 162/16 |
| 3,480,665 A | 11/1969 | Nagy | 260/501.13 |
| 3,483,031 A | 12/1969 | Lauer et al. | 127/41 |
| 3,493,497 A | 2/1970 | Pretorius et al. | 210/31 |
| 3,494,103 A | 2/1970 | Mir | 55/67 |
| 3,494,104 A | 2/1970 | Royer | 55/67 |
| 3,513,023 A | 5/1970 | Kusch et al. | 127/58 |
| 3,522,172 A | 7/1970 | Pretorius et al. | 210/31 |
| 3,539,505 A | 11/1970 | Lauer et al. | 210/31 |
| 3,558,725 A | 1/1971 | Kohno et al. | 260/635 |
| 3,579,380 A | 5/1971 | Friese | 127/37 |
| 3,607,392 A | 9/1971 | Lauer et al. | 127/15 |
| 3,619,369 A | 11/1971 | Onishi et al. | 195/37 |
| 3,632,656 A | 1/1972 | Unver | 260/635 R |
| 3,692,582 A | 9/1972 | Melaja | 127/46 A |
| 3,694,158 A | 9/1972 | Lauer et al. | 23/230 R |
| 3,704,168 A | 11/1972 | Hara et al. | 127/58 |
| 3,730,770 A | 5/1973 | Zievers et al. | 127/46 B |
| 3,732,982 A | 5/1973 | Dunnill et al. | 210/198 C |
| 3,743,539 A | 7/1973 | Kroyer et al. | 127/16 |
| 3,756,855 A | 9/1973 | Duchateau et al. | 127/63 |
| 3,796,657 A | 3/1974 | Pretorius et al. | 210/31 C |
| 3,814,253 A | 6/1974 | Forsberg | 210/97 |
| 3,817,787 A | 6/1974 | Hertzen et al. | 127/46 B |
| 3,826,905 A | 7/1974 | Valkama et al. | 235/151.14 |
| 3,835,043 A | 9/1974 | Geissler et al. | 210/31 C |
| 3,884,714 A | 5/1975 | Schneider et al. | 127/46 B |
| 3,928,062 A | 12/1975 | Yamauchi | 127/60 |
| 3,928,193 A | 12/1975 | Melaja et al. | 210/31 C |
| 3,959,519 A | 5/1976 | Johnson | 426/648 |
| 3,982,003 A | 9/1976 | Mitchell et al. | 426/1 |
| 4,001,112 A | 1/1977 | Barker et al. | 210/31 C |
| 4,008,285 A | 2/1977 | Melaja et al. | 260/635 C |
| 4,075,406 A | 2/1978 | Melaja et al. | 536/1 |
| 4,096,036 A | 6/1978 | Liu et al. | 195/31 F |
| 4,104,078 A | 8/1978 | Barker et al. | 127/46 R |
| 4,143,169 A | 3/1979 | Skock et al. | 426/307 |
| 4,145,230 A | 3/1979 | Madsen et al. | 127/60 |
| 4,182,633 A | 1/1980 | Ishikawa et al. | 127/46 A |
| 4,208,284 A | 6/1980 | Pretorius et al. | 210/65 |
| 4,213,913 A | 7/1980 | de Rosset | 260/428.5 |
| 4,218,438 A | 8/1980 | Callender et al. | 424/115 |
| 4,259,186 A | 3/1981 | Boeing et al. | 210/198.2 |
| 4,366,060 A | 12/1982 | Leiser et al. | 210/635 |
| 4,368,268 A | 1/1983 | Gong | 435/161 |
| 4,391,649 A | 7/1983 | Shimizu et al. | 127/46.2 |
| 4,404,037 A | 9/1983 | Broughton | 127/55 |
| 4,405,455 A | 9/1983 | Ando et al. | 210/191 |
| 4,412,366 A | 11/1983 | Rock et al. | 16/236 |
| 4,426,232 A | 1/1984 | Neuzil et al. | 127/46.3 |
| 4,451,489 A | 5/1984 | Beale et al. | 426/254 |
| 4,482,761 A | 11/1984 | Chao et al. | 11/198 |
| 4,498,991 A | 2/1985 | Oroskar | 127/46.1 |
| 4,518,436 A | 5/1985 | van der Poel | 127/60 |
| 4,519,845 A | 5/1985 | Ou | 127/46.2 |
| 4,599,115 A | 7/1986 | Ando et al. | 127/46.1 |
| 4,631,129 A | 12/1986 | Heikkila | 210/635 |
| 4,636,315 A | 1/1987 | Allen, Jr. | 210/656 |
| 4,666,527 A | 5/1987 | Ito et al. | 127/60 |
| 4,724,006 A | 2/1988 | Day | 127/30 |
| 4,732,687 A | 3/1988 | Muller et al. | 210/656 |
| 4,837,315 A | 6/1989 | Kulprathipanja | 127/46.1 |
| 4,857,642 A | 8/1989 | Kulprathipanja | 536/127 |
| 4,873,111 A | 10/1989 | Aaltonen et al. | 426/623 |
| 4,938,804 A | 7/1990 | Heikkila et al. | 127/60 |
| 4,938,974 A | 7/1990 | Bichsel et al. | 426/74 |
| 4,940,548 A | 7/1990 | Zinnen | 210/656 |
| 4,955,363 A | 9/1990 | Harju et al. | 127/46.1 |
| 4,970,002 A | 11/1990 | Ando et al. | 210/659 |
| 4,976,865 A | 12/1990 | Sanchez et al. | 210/635 |
| 4,980,277 A | 12/1990 | Junnila | 435/2 |
| 4,990,259 A | 2/1991 | Kearney et al. | 210/659 |
| 5,032,156 A | 7/1991 | Luder et al. | 55/269 |
| 5,043,171 A | 8/1991 | Bichsel et al. | 426/74 |
| 5,081,026 A | 1/1992 | Heikkila et al. | 435/158 |
| 5,084,104 A | 1/1992 | Heikkila et al. | 127/46.2 |
| 5,102,553 A | 4/1992 | Kearney et al. | 210/659 |
| 5,124,133 A | 6/1992 | Schoenrock | 422/191 |
| 5,177,008 A | 1/1993 | Kampen | 435/139 |
| 5,198,120 A | 3/1993 | Masuda et al. | 210/659 |
| 5,382,294 A | 1/1995 | Rimedio et al. | 127/42 |
| 5,384,035 A | 1/1995 | Smolnik et al. | 210/635 |
| 5,387,347 A | 2/1995 | Rothchild | 127/46.1 |
| 5,482,631 A | 1/1996 | Saska et al. | 127/46.2 |
| 5,494,525 A | 2/1996 | Heikkila et al. | 127/61 |
| 5,637,225 A | 6/1997 | Heikkila et al. | 210/659 |
| 5,730,877 A | 3/1998 | Heikkila et al. | 210/659 |
| 5,770,061 A | 6/1998 | Heikkila et al. | 210/198.2 |
| 5,773,052 A | 6/1998 | Virtanen et al. | 426/2 |
| 5,795,398 A | 8/1998 | Hyoky | 127/46.1 |
| 5,851,405 A | 12/1998 | Paananen | 210/724 |
| 5,858,424 A | 1/1999 | Virkki | 426/54 |
| 5,932,016 A | 8/1999 | Paananen | 127/48 |
| 5,980,640 A | 11/1999 | Nurmi | 127/60 |
| 6,022,394 A | 2/2000 | Paananen | 71/26 |
| 6,093,326 A | 7/2000 | Heikkila | 210/659 |
| 6,187,204 B1 | 2/2001 | Heikkila | 210/659 |
| 6,214,125 B1 | 4/2001 | Hyoky | 127/46.1 |
| 6,224,776 B1 | 5/2001 | Heikkila | 210/659 |

FOREIGN PATENT DOCUMENTS

| | | | |
|---|---|---|---|
| DE | 25 11 904 | 9/1976 | 210/659 |
| DE | 40 41 414 A1 | 6/1991 | 210/659 |
| EP | 0 010 769 A2 | 5/1980 | 210/659 |
| EP | WO 81/02420 | 6/1982 | 210/659 |
| EP | 0 101 304 A2 | 2/1984 | 210/659 |
| EP | 0 279 946 A2 | 8/1988 | 210/659 |
| EP | 0 345 511 A3 | 12/1989 | 210/659 |
| EP | 0 663 224 A1 | 7/1995 | 210/659 |
| FI | 68526 | 6/1985 | 210/659 |

| | | | | |
|---|---|---|---|---|
| FI | 75503 | 3/1988 | | 210/659 |
| FI | 77845 | 1/1989 | | 210/659 |
| FI | 86416 | 5/1992 | | 210/659 |
| FI | 875655 | 6/1998 | | 210/659 |
| GB | 715774 | 9/1954 | | 210/659 |
| GB | 1 448 524 | 9/1976 | | 210/659 |
| GB | 1326765 | 9/1977 | | 210/659 |
| GB | 2 240 053 | 7/1991 | | 210/659 |
| JP | SHO 39-5429 | 4/1964 | | 210/659 |
| JP | 02-124895 | 5/1990 | | 210/659 |
| RU | 445270 | 6/1976 | | 210/659 |
| RU | SU 1072818 A | 2/1981 | | 210/659 |
| SU | 4614225/13 | 2/1980 | | 210/659 |
| WO | 81/00014 | 9/1981 | | 210/659 |
| WO | WO 81/02420 | 9/1981 | | 210/198.2 |
| WO | 82/00712 | 12/1982 | | 210/659 |
| WO | WO 82/04265 | 12/1982 | | 210/198.2 |
| WO | WO 94/17213 | 8/1994 | | 210/659 |
| WO | WO 98/30724 | 7/1998 | | 210/659 |
| WO | WO 98/32514 | 7/1998 | | 210/659 |
| ZA | 32855 ZA | 2/1998 | | 210/659 |

OTHER PUBLICATIONS

Minute order and Memorandum Opinion and Order (Mar. 28, 2001).

Plaintiff's Memorandum in Support of Motion for Reconsideration of this Court's Decision of Mar. 28, 2001 Holding the '398 Patent Invalid, or in the Alternative, to Certify the Issue for Appeal. (Apr. 27, 2001).

Plaintiff's Notice of Recent Federal Circuit Decision Relevant to Plaintiff's Motion for Reconsideration of this Court's Decision of Mar. 28, 2001. (Jul. 9, 2001).

Defendants' Response to Plaintiff's Notice of Recent Federal Circuit Decision (Jul. 13, 2001).

Plaintiff's Memorandum in Support of its Renewed Motion for Reconsideration of this Court's Decision of Mar. 28, 2001 in View of the Federal Circuit's Decision in Group One, Ltd. v. Hallmark Cards, Inc. 254 F.3d 1041 (Fed. Cir. 2001), or in the Alternative, to Certify the Issue for Appeal. (Aug. 10, 2001).

Plaintiff's Supplemental Memorandum in Support of its Motion for Reconsideration of this Court's Decision of Mar. 28, 2001. (Sep. 14, 2001).

Defendants' Response to Plaintiff's Supplemental Memorandum in Support of its Motion for Reconsideration (Sep. 24, 2001).

Reply Memorandum in Support of Defendants' Motion for Summary Judgment of Invalidity of the '398 Patent for Obviousness under §103 on Jan. 10, 2000.

"The Development and Application of Continuous Ion Exclusion" by Karl W.R. Schoenrock of the Amalgamated Sugar Company, presented to the 18th General Assembly, Commission International De Sucrerie, Ferrara, Jun. 8–12, 1987.

*Molasses Separation at SMSC*, Feb. 18, 1991 (F43325–F43329).

Cultor Travel/Meeting Report *Preliminary Cost Estimate for Crystalline Betaine Production*, by Peter Norrman, Jun. 8, 1989 (F49931–F49936).

Cultor Ltd. Finnsugar Bioproducts *Visit Report*, by Kaj–Erik Monten, Jul. 15, 1991 (F36461–F36469).

SMBSC/Cultor Joint Research Project, *Research Schedule*, for Mar.–Jun. 1993 by Goran Hyoky updated Mar. 17, 1993. pp. 1–3.

Finnsugar Report, *Betaine Separation in Renville Preliminary Investment Costs*, by Peter Norrman, Mar. 7–8, 1993 (F44079–F44082).

Technical Report 8: *Alternative Separation Methods* by Goran Hyoky, Jan. 21, 1994. pp. 45083–F45093.

*Some Technical and Economic Aspects of The Chromatographic Separation of Sugar Solutions* by H. Hongisto, Finnish Sugar Company Ltd. presented to British Sugar Corporation Ltd. 23$^{rd}$ Technical Conference in Eastbourne, Jun. 1976. pp. F004309–F004334.

*Large–Scale Adsorption and Chromatography*, vol. I, by Phillip C. Wankat, published by CRC Press, Inc., pp. 1–5, 1986.

*Large–Scale Adsorption and Chromatography*, vol. II, by Phillip C. Wankat, published by CRC Press, Inc., pp. 1–113, 1986.

*Ion Exclusion Purification of Molasses* by J.B. Stark, 1964. pp. A014923–A014933.

*Purolite Chromatographic Ion–exchange Resins* undated pp. 1–5.

Southern Minnesota Beet Sugar Cooperative *Separation Process Training* by Goran Hyoky, Feb. 1992 (F37933–F37985).

Cultor Ltd. *Operation Manual* for the Cultor/Finnsugar Molasses, Southern Minnesota Beet Sugar Cooperative, by Goran Hyoky and Esko Varteva, Nov. 6, 1989, as revised Jul. 20, 1992, (Zitterkopf Exhibit 3) (F44355–F44397).

Cultor Ltd. *Separation Program*, One Step Separation Sequence in SMS, Two Step Separation Sequence for Western Sugar, By Jarmo Kuisma, May 25, 1993 (Hyoky Exhibit 15) (F45859–F45892).

Cultor Ltd. *Program for New Looping* by Goran Hyoky, May 8, 1992 (Hyoky Exhibit 16) (F44085–F44086).

Cultor Ltd. *Program for New Looping* (*Two Phase Process*) by Goran Hyoky, Jul. 8, 1992 and cover letter (Hyoky Exhibit 17) (F44273–F44274).

*Molasses and Betaine SMB Separation Daily Material Balance*, accompanied by Charts: *Betaine Separation In Renville, Preliminary Investment Cost*, by Peter Norrman of Finnsugar Ltd., Mar. 7, 1993, with cover letter of Mar. 8, 1993 (F36351–F36356 and F36360–F36363).

*Weekly Reports* 1/93–49/94 by Goran Hyoky for SMBSC/Cultor Joint Research Project, Mar. 18, 1993 through Feb. 13, 1994 (Zitterkopf Exhibit 5) (F45237–F45202).

*Technical Report* 4/93 by Goran Hyoky for SMBSC/Cultor Joint Research Project, Aug. 13, 1993 (F45063–F45082).

*Technical Report* 5/93 by Groan Hyoky for SMBSC/Cultor Joint Research Project, Sep. 28, 1993 (F38197–F38202).

*Technical Report* 6/93 by Goran Hyoky for SMBSC/Cultor Joint Research Project, Oct. 28, 1993 (F45113–F45121).

Cultor Ltd. Finnsugar Bioproducts *Trip Report* Southern Minnesota Sugar Beet Cooperative by Kaj–Erik Monten, Apr. 23, 1993 with Diagram: *Molasses and Betaine SMB Separation Daily Material Balance And Chart:* Betaine Separation at SMSC, Renville, Preliminary Calculation by Kaj–Erik Monten, Apr. 10, 1993 (F36339–F36347).

*Research Program* updated May 17, 1993 with Research Schedule by Goran Hyoky for SMSBC/Cultor Joint Research Project (Hyoky Exhibit No. 3) (F035514–F035521).

SMSC *Certificate of Performance* with cover letter from Kaj–Erik Monten, Jun. 14, 1993 (Monten Exhibit No. 13) (F36555–F36557).

*Sucrose Fraction* Polishing by Goran Hyoky, Jun. 28, 1993 (Hyoky Exhibit No. 4) (F38220–F38231).

Cultor Ltd. *Research Plan* for SMB Separation Test/SMSC Betaine Fraction, by J. Rinne, Nov. 15, 1993 (F035414–F035415).

Finnsugar Development *Report* for SMB Separation Test/SMBSC Betaine Fraction, by Jukka Rinne, Dec. 24, 1993 (F035391–F035395).

Finnsugar Ltd. *Report* with schematic diagram of steps used in the SMSC betaine separation of the pilot scale SMB system; Chart of No Secondary Separation; Charts with Secondary Separation; Graph of Concentration Gradient; Tables of Test Runs; and Charts with Material Balances; by Jukka Rinne, Dec. 28, 1993 (F80090–F80102).

Finnsugar *Report* with charts, graphs, and diagram of steps used with the SMSC–betaine separation on the pilot scale SMB system, by Jukka Rinne, Dec. 28, 1993 (F80103–F80164).

Joint Research Report for Southern Minnesota Beet Sugar Cooperative and Cultor/Finnsugar Bioproducts, Inc., by Goran Hyoky and Jean–Pierre Monclin, Jan. 1994 (Kuisma Exhibit No. 7) (F36617–F36646).

Defendant's Response to Finnsugar's Interrogatories Regarding The '398 Patent dated Nov. 3, 1999. pp. 1–8.

Affirmative Expert Disclosure of Dr. Michael Cleary dated Sep. 21, 1999. pp. 1–17.

Rebuttal Expert Disclosure of Dr. Michael Cleary dated Oct. 12, 1999. pp. 1–18.

Defendant ARI's Response to Finnsugar's Motion For Preliminary Injunction dated Jun. 1, 1999. pp. 1–15.

Rule 56.1(a)(3) Statement of Facts in Support of Defendants' Motion for Summary Judgment for Invalidity of the '398 Patent Under the §102(b) "On Sale" Bar dated Nov. 15, 1999. pp. 1–17.

Memorandum in Support of Defendants' Motion for Summary Judgment for Invalidity of the '398 Patent Under the §102(b) "On Sale" Bar dated Nov. 15, 1999. pp. 1–16.

Statement of Facts in Support of Defendants' Motion for Summary Judgment for Invalidity of the '398 Patent for Obviousness under §103 dated Nov. 15, 1999. pp. 1–9.

Memorandum in Support of Defendants' Motion for Summary Judgment for Invalidity of the '398 Patent for Obviousness under §103 dated Nov. 15, 1999. pp. 1–14.

"Proceedings Of The Research Society Of Japan Sugar Refineries' Technologists", edited by The Research Institute Of The Japan Sugar Refiners' Association, vol. 27, Aug., 1977.

"Purification Of Sugar Products By The Ion Exclusion Process" by D. Gross of Tate & Lyle, Ltd., Research Centre, Keston, Kent, England; presented to the 14th General Assembly, C.I.T.S, Brussels, 1971.

Processing Equipment: "High–volume chromatography separates the 'hard to separate' organic Compounds", *Food Engineering,* May, 1983.

"Simultaneously Continuous Separation of Glucose, Maltose, and Maltotriose Using a Simulated Moving–Bed Adsorber" by Kyu Beom Kim, Shiro Kishihara, and Satoshi Fujii of The Graduate School of Science and Technology, Kobe University, I, Rokkadai, Nada–ku, Kobe 657, Japan Received Sep. 2, 1991.

Chromatographic Separation: "A Sequential Chromatographic Process for the Separation of Glucose/Fructose Mixtures", by P. E. Barker, C. H. Chuah of the Chemical Engineering Department, University of Aston in Birmingham, Gosta Green, Birmingham, *The Chemical Engineer,* (Aug./Sep. 1981), pp. 389–393.

"On The Utilization Of Betaine From Sugar Beets" by J.P. Dubois, Raffinerie Tirlementoise, s.a., D–3300 Tienan (Belgium). Undated.

S.I.T. Paper #649: "An Audubon Sugar Institute–Applexion Process For Desugarization Of Cane Molasses", by M. Saska, Ch. Pelletan, Mei Di Wu and X. Lancrenon, presented at the 1993 Sugar Industry Technologists Meeting, Jun. 13–16, 1993, Toronto Ontario.

S.I.T. Paper #428: "Liquid Sugar From The Chromatographic Molasses Desugarization Process" by H. J. Hongisto, Finnish Sugar Co., Ltd., Kantvik, Finland, vol. XXXVIII, Publication of Technical Papers and Proceedings of the 38th Annual Meeting of Sugar Industry Technologists, Inc, Boston, Massachusetts, May 6–9, 1979.

"Desugarisation of Cane Molasses By the Finnsugar Chromatographic Separation Process", By H. Hongisto and H. Heikkila, reprint ISSCT (1977).

"Beet Sugar" by Michael Cleary of Imperial Holly Corporation appearing in Kurk–Othmer, *Encyclopedia Of Chemical Technology,* Fourth Edition, vol. 23, published by John Wiley & Sons, Wiley–Interscience (1997).

Process Technology: "Separating Sugars And Amino Acids With Chromatography", by Heikki Heikkila, Finnish Sugar Co., Ltd., *Chemical Engineering* Jan. 24, 1983, pp. 50–52.

"Trends In The Chromatographic Separation Of Molasses", by Hannu A. Paananen, *Zuckerind 122* (1997) No. 1, pp. 28–33.

"Engineering Analysis Of Ion Exclusion For Sucrose Recovery from Beet Molasses, Part 1 Experimental Procedures And Data Reduction Techniques" by W.G. Schultz, J. B. Stark and E. Lowe, Western Regional Research Laboratory, Western Utilization Research And Development Division, Agricultural Research Service, U.S. Department of Agriculture, Albany, California, 94710 U.S.A., published in the *International Sugar Journal,* Feb., 1967.

"Engineering Analysis Of Ion Exclusion For Sucrose Recovery From Beet Molasses, Part 11 Data Analysis And Cost Projection" by W.G. Schultz, J. B. Stark and E. Lowe, Western Regional Research Laboratory, Western Utilization Research And Development Division, Agricultural Research Service, U.S. Department of Agriculture, Albany, California, 94710 U.S.A., published by the *International Sugar Journal,* Apr., 1967.

S.I.T. Paper 373: "The Recovery Of Sugar From Beet Molasses By Ion Exclusion", by James F. Zieverz and C.J. Novotny, Industrial Filter & Pump Mfg. Co., Cicero, Illinois. Undated.

"Recovery Of Sugar From Beet Molasses" By The P. & L. Exclusion Process, by H.G. Schneider and J. Mikule of Pfeifer & Langen, Euskirchen, Germany, published in the *International Sugar Journal,* Part I, pp. 259–264, Sep. 1975.

"Recovery of Sugar From Beet Molasses by The P. & L. Exclusion Process", by H.G. Schneider and J. Mikulse of Pfeifer & Langen, Euskirchen, Germany, published in the *International Sugar Journal,* Part II, pp. 294–298, Oct., 1975.

Chromatographic Separation of Sugar Solutions: "The Finnsugar Molasses Desugarization Process", Part II, by H. J. Hongisto, Technical Department, Finnish Sugar Company, Ltd., Kantvik, Finland, published by the *International Sugar Journal,* May 1977, pp. 132–134.

"Trends In The Chromatographic Separation Of Molasses", by Hannu A. Paananen of Cultor Ltd., Finnsugar Bioproducts, Helsinki, Finland, Proceedings of the Workshop on Separation Process in the Sugar Industry, New Orleans, Apr., 1996, pp. 100–119.

Ari: "*Coupled Loop Chromatography*" by Mike Kearney of Amalgamated Research, Inc., Presented at the 29$^{th}$ General Meeting, American Society of Beet Sugar Technologists, Mar. 1977.

"Simulated Moving–Bed Technology In The Sweetener Industry", by D. Eugene Rearick, Michael Kearney, and Dennis D. Costesso of Amalgamated Research, Inc., published in *Chemtech,* vol. 27, No. 9, pp. 36–40. Undated.

"Desugarisation Of Beet Molasses By the Finnsugar Chromatographic Separation Process", by H. Hongisto, Finnsugar Engineering. Undated.

SPRI: "*Trends In The Chromatographic Separation of Molasses*", by Hannu A. Paananen of Cultor, Ltd., Finnsugar Bioproducts, Helsinki, Finland, presented at the Proceedings of the 1996 Workshop on Separation Process in the Sugar Industry. 1996.

"The Recovery Of Sugar From Beet Molasses By the P. & L. Exclusion–Process", by H. G. Schneider and J. Mikule of Pfeifen & Lange, Euskirchen, Germany. Undated.

"Engineered Fractal Cascades For Fluid Control Applications" by Mike Kearney of Amalgamated Research, Inc., Twin Falls, Idaho. Undated.

"Control Of Fluid Dynamics With Engineered Fractal Cascades–Adsorption Process Applications", by Mike Kearney, Director, New Technology, Amalgamated Research Inc., Twin Falls Idaho 1997.

"Molasses Exhaustion Session", Keynote Speech Summary, by Mike Kearney, Director, New Technology, Amalgamated Research Inc., published by British Sugar EuroTechLink 97, England. Undated.

"Multicomponent Separation Using Simulated Moving Bed Chromatography", by V. Kochergin and M. Kearney of Amalgamated Research, Inc., presented at AIChE Annual Meeting, Los Angeles, Nov. 16–21, 1997, Novel Adsorption–Based Separation Equipment Configuration, AIChE Proceedings, Part 2, pp. 1539–1544.

"Molassesdesugarization with Liquid Distribution Chromatography", by Dr. Mohammad Munir, Zentral–Laboratorium dor Suddautschen Zucker–Aktiengesollschaft, presented at 15$^{th}$ General Assembly of Commission Internationale Technique de Sucrerie, Vienna, Austria, May 12–16, 1975.

"Ion Exclusion . . . an overlook ally", by James F. Zievers, C. J. Novotny, and E. A. Selvick of Industrial Filter and Pump Mfg. Co., Cicero, Illinois, published in *The Sugar Journal,* Feb., 1972, pp. 7–10.

"Ion Exchange For Desugaring Of Molasses And Byproduct Isolation", by L.H. Ramm–Schmidt, published by B.V. Amaterdam, 1988, printed in Netherlands, pp. 111–126. Undated.

"Application Of The Finnsugar–Pfeifer & Langen Molasses Desugarisation Process In A Beet Sugar Factory", by H. J. Hongisto and P. Laakso.

"The Removal Of Color From Sugar Solutions By Adsorbent Resins", by R. I. M. Abrams, Technical manager of Duplite Ion Exchange Resins, Diamond Shamrock Chemical Company, Redwood City, California, published in *Sugar y Azuca,* 1971, pp. 31–34.

"Simulated Moving Bed Technology Applied To The Chromatographic Recovery Of Sucrose From Sucrose Syrups", by Mike Kearney of The Amalgamated Sugar Company, Twin Falls, Idaho, presented at Conference on Sugar Processing Research, Fiftieth Anniversary Conference, San Francisco, California, May 29–Jun. 1, 1990.

Ion Exclusion– An Overlook Ally: "*Ion Exclusion Experiments*", by James F. Zievers, C.J. Novotny, and E. A. Selvick of Industrial Filter and Pump Mfg. Co., Cicero, Illinois, Oct. 4, 1970, pp. 12–24.

"Separation Processes in the Sugar Industry". Proceedings of S.P.R.I. Workshop on Separation Processes in the Sugar Industry, Edited by Margaret A. Clarke. Sugar Processing Research Institute Inc., New Orleans, LA Oct., 1996.

"New Development In The Chromatographic Desugarisation Of Beet Molasses", by Francois Rouseet, Applexion, France, published by British Sugar EuroTechLink 97, York England. Undated.

"Chromatographic Separation Of Sugar Solutions The Finnsugar Molasses Desugarization Process", by H. J. Hongisto, Technical Department, Finnish Sugar Company, Ltd., Kantvik, Finland, presented to the 23$^{rd}$ Tech. Conf., British Sugar Corp. Ltd, 1976, Part I published in *International Sugar Journal,* Apr. 1977, pp. 100–104.

"Chromatographic Separation Of Sugar Solutions The Finnsugar Molasses Desugarization Process", by H. J. Hongisto, Technical Department, Finnish Sugar Company, Ltd., Kantvik, Finland, presented to the 23$^{rd}$ Tech. Conf., British Sugar Corp. Ltd, 1976,.Part II published in *International Sugar Journal,* May 1977, pp. 131–134.

"Ion Exclusion Purification Of Sugar Juices", by Lloyd Norman, Guy Rorabaugh, and Harold Keller, Research Laboratory Manger and General Chemist, Director of Research, Holly Sugar Corporation and Assistant Director, Illinois Water Treatment Company, published by *Journal of A. S. S. B. T.,* vol. 12, No. 5, Apr., 1963, pp. 362–370.

"Chemical Educators Stress Industry Ties" by Ward Worthy and Richard J. Seltzer of C&EN Washington, published Oct. 6, 1975, C&EN.

"Adsorption Separates Xylenes" by Seiya Otani of Toray Industries, Inc., published by *Chemical Engineering,* Sep. 17, 1973.

"Designing Large–Scale Adsorptive Separations" by E.N. Lightfoot, S.J. Gibbs, A.M. Athalye and T.H. Scholten of Department of Chemical Engineering, University of Wisconsin, Madison, WI., published *Israel Journal of Chemistry,* vol. 30, 1990, pp. 229–237.

"Continuous Chromatographic Separation Of Fructose/ Glucose" by Tetsuya Hirota of Mitsubishi Chemical Industries, Ltd., published *Sugar y Azucar* Jan. 1980.

"*Mechanism Of The Separation Of Glucose And Fructose On A Strong–Acid Cation Exchanger*" by Charles A. Sauer of Applications Development, Duolite International, Inc., a subsidiary of Diamond Shamrock Corporation, Apr. 23, 1981.

"*High Purity Fructose Via Continuous Adsorptive Separation*" by D.B. Broughton, H.J. Bieser, R.C. Berg, E.D. Connell, D.J. Korous, and R.W. Neuzil of UOP, Inc., published *La Sucrerie Belge,* vol. 96–May 1977, pp. 155–162.

"*Large–Scale Chromatography: New Separation Tool*" by R.S. Timmins, L Mir, and J.M. Ryan of Absor, Inc., published by *Chemical Engineering,* May 19, 1969, pp. 170–178.

"*The Tasco Chromatographic Separator At Twin Falls Factory*" by K. P. Chertudi of The Amalgamated Sugar Company, published by *International Sugar Journal,* 1991, vol. 93, No. 1106.

"*The Amalgamated Sugar Company Raw Juice Chromatographic Separation Process*" by Mike Kearney and D. Eugene Rearick of The Amalgamated Sugar Company Research Laboratory, Twin Falls, Idaho, presented at 1995 C.I.T.S. 20$^{th}$ General Assembly, Munich, Germany, Jun., 1995.

"Contribution To The Biochemistry And Use Of The Beet Constituent Betaine.," Von W. Steinmetzer 25 (1972) No. 2, pp. 48–57.

Finnsugar Bioproducts, Inc. v. The Amalgamated Sugar Company, LLC, et al., Civil Action No. 97–C–8746 (N.D. Ill.)—Answer and Counterclaims to the Amended and Supplemental Complaint of the Amalgamated Sugar Company, LLC and Amalgamated Research, Inc. Undated.

STEP 1

| | | |
|---|---|---|
| feed | 20 l | (35 l/h) |
| recycling fraction | 9 l | (35 l/h) |
| sucrose | 11 l | (35 l/h) |

STEP 2

| | | |
|---|---|---|
| sucrose | 16 l | (70 l/h) |
| recycling fraction | 4 l | (70 l/h) |

STEP 3

| | | |
|---|---|---|
| recycl.(loop I) | 8 l | (70 l/h) |
| betaine | 10 l | (40 l/h) |

STEP 4

| | | |
|---|---|---|
| 1. residue | 26 l | (70 l/h) |
| 2. residue | 26 l | (75 l/h) |
| betaine | 5 l | (40 l/h) |
| 3. residue | 15 l | (40 l/h) |

STEP 5

| | | |
|---|---|---|
| recycl.(loop I) | 11 l | (22 l/h) |
| recycl.(loop II) | 12 l | (75 l/h) |
| recycl.(loop III) | 11 l | (70 l/h) |

METHOD FOR THE FRACTIONATION OF MOLASSES

This application is a continuation of prior application Ser. No. 09/374,582, filed Aug. 13, 1999 now U.S. Pat. No. 6,187,204, which is a continuation of application Ser. No. 08/925,903, filed Sep. 9, 1997, now U.S. Pat. No. 6,093,326, which is a continuation of application Ser. No. 08/541,568, file Oct. 10, 1995, abandoned, which is a continuation of application Ser. No. 08/187,421, file Jan. 25, 1994, abandoned.

The present invention relates to a method for the fractionation of molasses using a chromatographic simulated moving bed system in which the liquid flow is effected in a single direction in a system comprising at least two chromatographic partial packing material beds. Fractionation of molasses denotes fractionation of various vegetable-derived by-products of the food and fermenting industries, such as beet and cane molasses, stillage, vinasse, slop, wood molasses, corn steep water, wheat, barley and corn molasses (hydrolyzed C starch). In the method of the invention, the product or products are recovered during a multi-step sequence comprising the following phases: feeding phase of molasses, eluting phase and recycling phase.

The liquid present in the partial packing material beds with their dry solids profile is recycled in the recycling phase in a loop comprising one, two or several partial packing material beds.

These phases are employed to form sequences comprising several process steps. In accordance with the invention, a sequence preferably comprises five to ten steps. A step comprises for example

- a molasses feeding phase and/or feeding of an eluant liquid and recovery of the product or products, or
- an eluting phase with recovery of a product or products, or
- recycling phase and eluting phase with recovery of a product or products, or
- two or more recycling phases.

Sequences comprising said steps are repeated five to seven times to reach an equilibrium.

Typically from three to twelve, preferably three to six chromatographic partial packing material beds are employed. A loop may comprise one, two or several partial packing material beds. Strongly acid cation exchange resin is preferably used as the column packing material.

The simulated moving bed system has been developed and introduced by UOP (United Oil Products), U.S.A., at the beginning of the 1960's, initially for petrochemical applications (U.S. Pat. No. 2,985,589). Today several simulated moving bed methods for a number of different applications are known (U.S. Pat. Nos. 3,706,812, 4,157,267, 4,267,054, 4,293,346, 4,312,678, 4,313,015, 4,332,623, 4,359,430, 4,379,751, 4,402,832, 4,412,866, 4,461,649, 4,533,398 and 5,127,957, and published European application 0,279,946).

The simulated moving bed system enables separating performances that are many times higher, and lower dilution of the products (consumption of eluant) than in the batch method.

The simulated moving bed method is either continuous or sequential.

In a continuous simulated moving bed method, all flows are continuous. These flows are: feeding of feed solution and eluant liquid, recycling of liquid mixture and recovery of products. (usually only two). The flow rate for these flows may be adjusted in accordance with the separation goals (yield, purity, capacity). Normally, 8 to 20 partial packing material beds are combined into a single loop. In accordance with the above-mentioned U.S. Pat. No. 4,402,832, the recycling phases have been applied to the recycling of dilute fractions. The feed and product recovery points are shifted cyclically in the downstream direction. On account of the feed of eluant liquid and feed solution (and on account of recovery of products) and the flow through the packing material bed, a dry solids profile is formed. Ingredients having a lower migration rate in the packing bed are concentrated at the downstream end of the dry solids profile, and respectively ingredients having a higher migration rate at the upstream end. Feeding points for feeding solution and eluant liquid and recovery points for product or products are shifted gradually at substantially the same rate at which the dry solids profile moves in the bed. The product or products are recovered substantially from the upstream and downstream end of the dry solids profile, and the feed solution is fed approximately to the maximum point of the dry solids profile and the eluant liquid approximately to the minimum point of the dry solids profile. Part of the separated product fraction is recycled on account of the continuous cyclic flow and as only part of the dry solids profile is removed from the packing material bed.

The cyclical shifting of the feed and recovery points is performed by using feed and recovery valves disposed along the packing material bed at the upstream and downstream end of each partial packing material bed. If it is desired to recover product fractions of high purity, short phase times and a plurality of partial packing material beds must be employed (the apparatus has corresponding valves and feed and recovery equipment).

In a sequential simulated moving bed method, not all flows are continuous. In a sequential simulated moving bed method the flows are: feeding of feed solution and eluant liquid, recycling of liquid mixture and recovery of products (two to four or more products; e.g. betaine as a third fraction in beet molasses separation and monosaccharides in cane sugar separation). The flow rate and the volumes of the different feeds and product fractions may be adjusted in accordance with the separation goals (yield, purity, capacity). The method comprises three basic phases: feeding, elution, and recycling. During the feed phase, a feed solution and possibly also an eluant liquid is fed into predetermined partial packing material beds, and simultaneously two or even three product fractions are recovered. During the eluting phase, eluant liquid is fed into a predetermined partial packing material bed, and during said phases one or even two product fractions are recovered in addition to the residue. During the recycling phase, no feed solution or eluant liquid is fed into the partial packing material beds and no products are recovered.

Finnish Patent Application 882740 (U.S. Pat. No. 5,127,957) discloses a method for recovery of betaine and sucrose from beet molasses using a sequential simulated moving bed method, the chromatographic system therein comprising at least three chromatographic partial packing material beds connected in series and adapted for the flow of liquids in a single direction in partial packing material beds, in which method betaine and sucrose are separated during the same sequence comprising:

- molasses feeding phase, in which a molasses feed solution is fed into one of said partial packing material beds and in which eluant water is fed substantially simultaneously into another partial packing material bed,
- feeding phase of eluant water, and
- recycling phase,
  - these phases being repeated either once or several times during the sequence.

A novel sequential simulated moving bed method has now been developed, which is particularly suitable for the fractionation of molasses. The novel method yields a purer sucrose solution with a better yield and/or capacity.

DESCRIPTION OF THE PREFERRED EMBODIMENTS

Figure 1A:
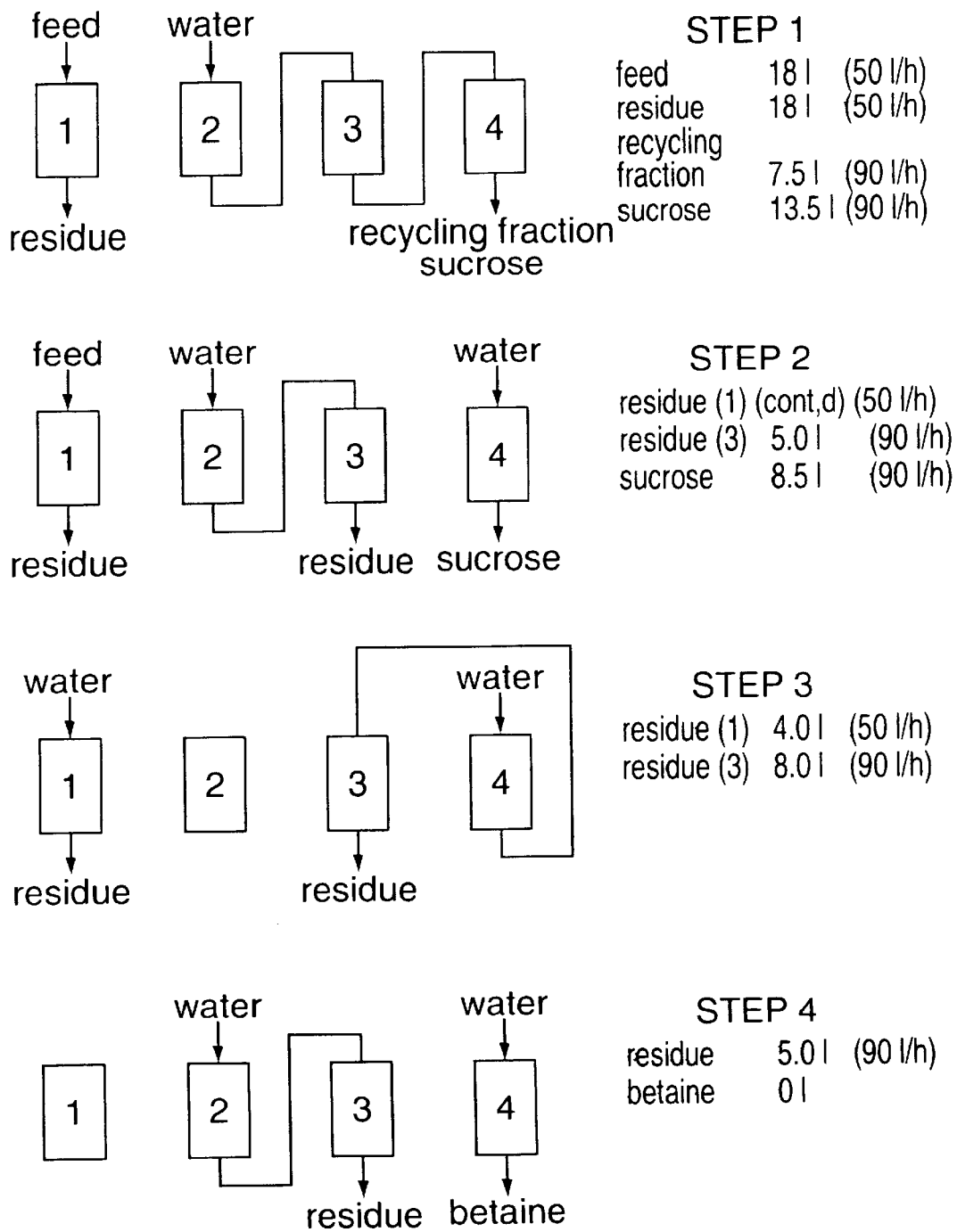
FIGS. 1A and 1B show a flow chart of the pilot plant of Example 1.

In the novel method, the liquid flow is arranged in a single direction in a system comprising at least two partial packing material beds, and the product is/products are recovered during a multi-step sequence. The partial packing material bed usually comprises one column. The sequence comprises feeding, eluting and recycling phases. During the recycling phase, the liquid in the partial packing material beds with their dry solids profile is recycled in a loop comprising one, two or several partial packing material beds.

Therefore, in the novel method recycling is employed in a novel way. In the recycling phase one, two or three or even more separate successive loops are formed. For example, the number of columns being four, the loop preferably comprises two columns. The loop may be closed or "open", i.e., when liquid is recycled in the other loop, eluant liquid can be fed into the other loop and the product fraction can be recovered therefrom. During feed and elution, the flow through the packing material beds may be effected between successive loops, the flows conveying material from one loop to another. During the recycling phase, the loop is closed and separated from the other loops. One separate dry solids profile is recycled in each loop.

Molasses is rich in various coloured components (colourants) which were difficult to remove completely enough by the earlier methods. Separate colour-removing phases were needed, or two-step crystallization had to be used to obtain a colourless product. The novel method according to the invention affords even 90% or greater colour removal in the molasses fractionating phase alone. The major part of the colour is separated already in the column group of that loop to which the feed solution is supplied, and it will not essentially contaminate the column groups of the second (or third) loop. Continuous and stable colour removal is achieved. When a batch method or conventional simulated moving bed methods (continuous or sequential), for instance, are employed, colour removal is normally only 75–80% in continuous long-term separation.

Also the separation of non-sugars, i.e. salts, is efficient when the method of the invention is used, and thus the sucrose content of the sugar fraction obtained from the separation can be very high, usually in advantageous cases in excess of 92–95% on the dry solids. The majority of the salts is separated already in the column group of that loop to which the feed solution is supplied, and thus the ion exclusion is more complete in the following loops. The result is a more symmetrical, sharper and higher sucrose peak, in other words, better separation of sucrose is achieved. When the bath method or conventional simulated moving bed methods (continuous or sequential), for instance, are employed, the sucrose content of the sugar fraction is in advantageous cases usually about or below 90–92% on the dry solids.

A strongly acid, gel-type cation exchange resin (e.g. "Zerolit 225", "Finex" or "Purolite") preferably in the sodium or potassium form is used as a packing for the columns.

Prior to the chromatographic fractionation, the feed solution (beet molasses) is preferably diluted with water to 20–65% by weight, softened with sodium carbonate and finally filtered using diatomaceous earth as a filtering aid. Prior to feed into separation columns, the molasses solution is heated to 40–85° C. and even to 95° C.

Water preferably at 40–85° C. is used for the elution.

The flow rate of the liquid in the columns is 0.5–10 $m^3/h/m^2$, even 20 $m^3/h/m^2$.

The following examples illustrate the novel sequential simulated moving bed method for the fractionation of molasses. These examples shall not be regarded as restricting the scope of the invention, as they are only examples of employing the method according to the invention to recover sucrose and betaine from beet molasses.

EXAMPLE 1

Figure 1B:
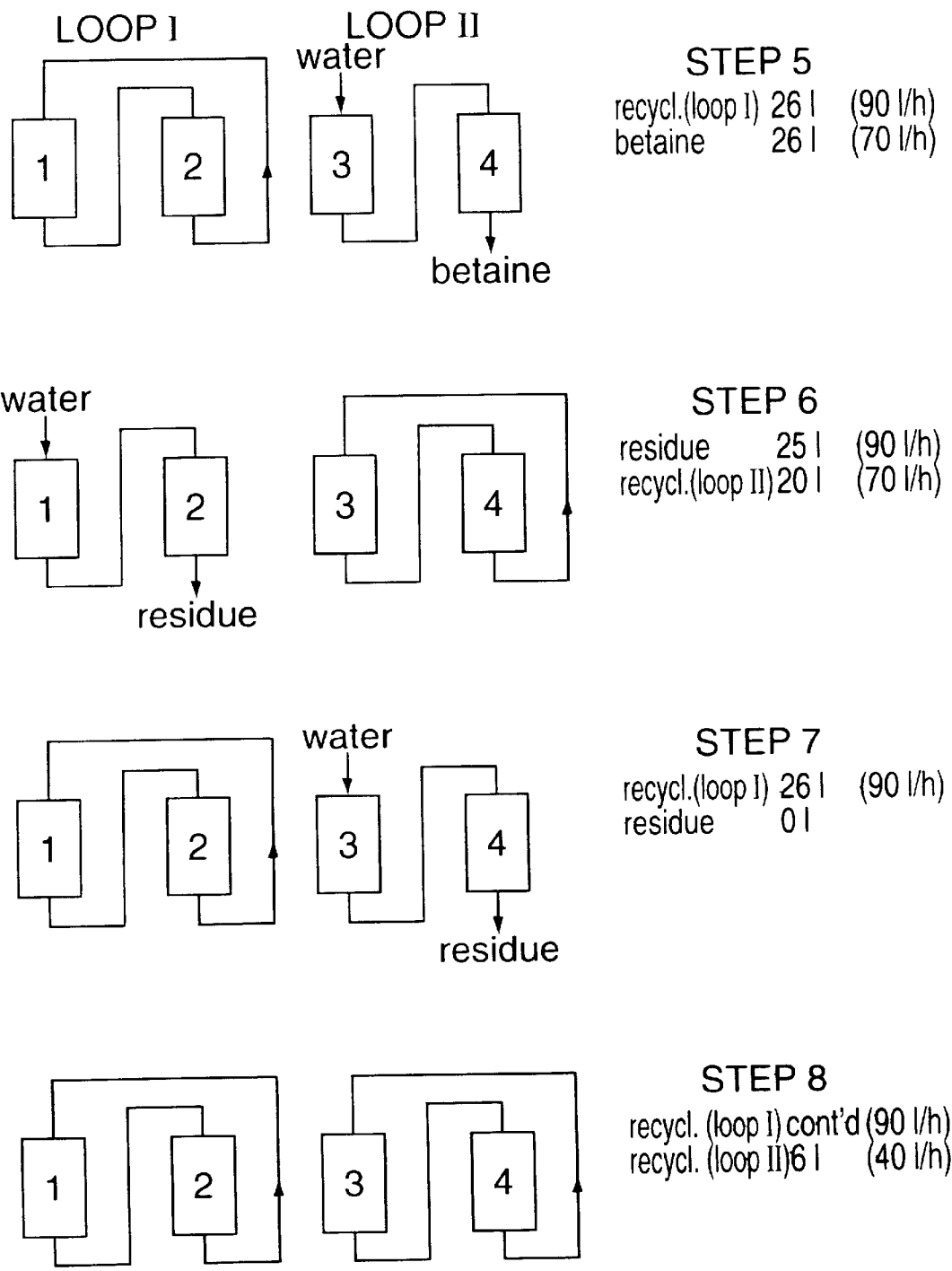

A pilot plant scale chromatographic test apparatus was employed. The apparatus included four columns, feed pumps, recycling pumps, eluant water pumps, flow and pressure regulators, and inlet and outlet valves for the different process streams. The flowchart is shown in FIG. 1.

The columns were packed with a strongly acid cation exchange resin ("Purolite"). The resin had a polystyrene/divinylbenzene backbone and was activated with sulphonic acid groups; the mean spherule size was about 0.36 mm. The resin had a DVB content of 5.5%. Initially the resin had been regenerated to sodium form, and during the run it was balanced with cations from the feed molasses.

| Test conditions: | |
| --- | --- |
| Diameter of columns | 200 mm |
| Height of resin bed/column | 2800 mm |
| Temperature | 75° C. |
| Flow rate | 40, 50, 70 and 90 l/h |

The feed solution consisted of beet molasses wherefrom calcium had been removed by adding sodium carbonate (pH 9) and filtering the precipitate off using diatomaceous earth as an aid.

The separation of sucrose and betaine was performed by an eight-step sequence in which each column had its specific function. As shown in FIG. 1, steps 5, 6 and 7 each comprise one recycling phase and one feeding phase for eluant water, and step 8 two recycling phases. The duration of the sequence was 79 minutes and the sucrose yield 84.0% (on the amount of sucrose fed).

Step 1: Molasses was fed (feeding phase) into column 1 at flow rate 50 l/h, and the residue fraction was eluted from the downstream end of the column. Simultaneously water was supplied (eluting phase) to column 2 at a flow rate 90 l/h, and a recycling fraction and sucrose were eluted from column 4. Said recycling fraction was used to dilute the raw material (molasses).

Step 2: Feeding of molasses into column 1 and elution of residue from the downstream end of column 1 were continued. Simultaneously water was supplied to columns 2 and 4 at a flow rate 90 l/h, the residue fraction was eluted from column 3, and the elution of sucrose was continued from column 4.

Step 3: Water was fed into columns 1 (50 l/h) and 4 (90 l/h), and the residue fraction was eluted from columns 1 and 3.

Step 4: Water was fed into column 2 at a rate 90 l/h, and the residue fraction was eluted from column 3.

Step 5: Recycling (recycling phase) in columns 1 and 2 at a rate 90 l/h; simultaneously water was supplied to column 3 at a rate 70 l/h and the betaine fraction was eluted from column 4.

Step 6: Water was fed into column 1 at a rate 90 l/h and the residue fraction was eluted from column 2; simultaneous recycling in columns 3 and 4 at a rate 70 l/h.

Step 7: Recycling in columns 1 and 2 at a rate 90 l/h.

Step 8: Recycling in columns 1 and 2 at a rate 90 l/h and in columns 3 and 4 at a rate 40 l/h.

After the sequence was completed, the process control program was continued and it returned to step 1. By repeating this sequence five to seven times, an equilibrium was reached in the system. The run was continued in a state of equilibrium, and product fractions with a constant composition were recovered and analyzed (cf. Tables 1 and 2).

The progress of the separation process was monitored with a density meter, a meter for optical activity, and a conductivity meter, and the separation was controlled by a microprocessor whereby precisely defined volumes and flow rates of feeds, recycled liquid and product fractions were controlled employing quantity/volume measuring, valves and pumps.

Figure 2:
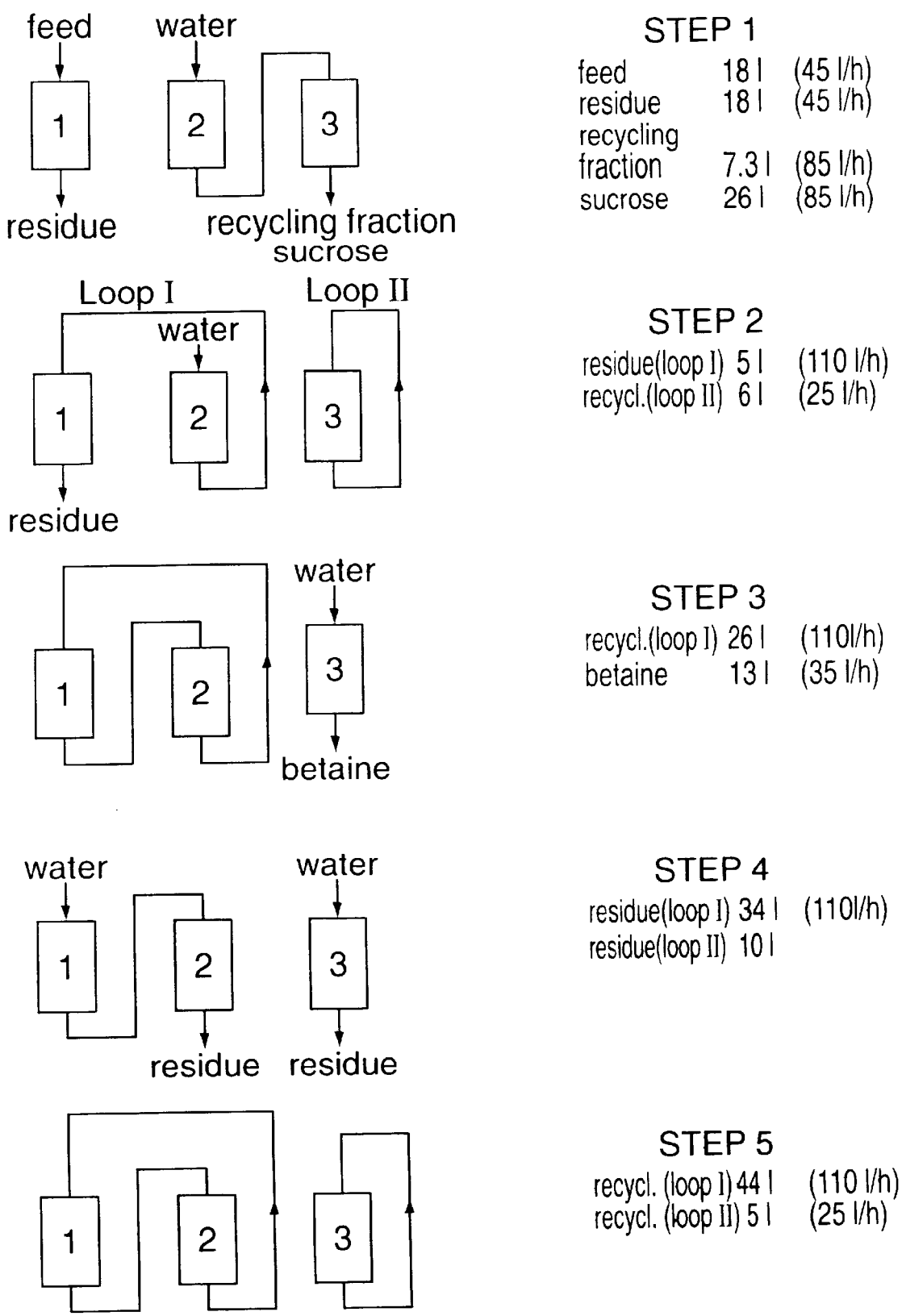
FIG. 2 shows a flow chart of the pilot plant of Example 2.

Table 1 shows the volumes of the feeds, recycled liquid and product fractions, and Table 2 shows the compositions of molasses and the product fractions. The sucrose and betaine fractions were recovered from column 4. Table 5 shows the colours of the molasses, residues and product fractions.

pressure regulators, and inlet and outlet valves for the different process streams. The flowchart is shown in FIG. 2.

The columns had been packed with a strongly acid cation exchange resin ("Purolite"). The resin had a polystyrene/divinylbenzene backbone and was activated with sulphonic acid groups; the mean spherule size was about 0.36 mm. The resin had a DVB content of 5.5%. Initially the resin had been regenerated to sodium form, and during the run it was balanced with cations from the feed molasses.

| Test conditions: | |
|---|---|
| Diameter of columns | 200 mm |
| Height of resin bed: | |
| columns 1 and 3 | 4100 mm |
| column 2 | 2800 mm |
| Temperature | 75° C. |
| Flow rates | 25, 35, 45, 85 and 110 l/h |

The feed solution consisted of beet molasses wherefrom calcium had been removed by adding sodium carbonate (pH 9) and filtering the precipitate off using diatomaceous earth as an aid.

The separation of sucrose and betaine was performed by a five-step sequence in which each column had its specific function. As shown in FIG. 2, steps 2 and 3 each comprise one recycling phase and one feeding phase for eluant water, and step 5 two recycling phases. The duration of the

TABLE 1

Volumes of feeds, recycled liquid and product fractions (l)

| Step No. | 1 | 2 | 3 | 4 | 5 | 6 | 7 | 8 |
|---|---|---|---|---|---|---|---|---|
| Molasses feed | 18*) | — | — | — | — | — | — | — |
| Water feed | 21 | 5.0 + 8.5 | 4.0 + 8.0 | 5.0 | 26.0 | 25.0 | 0 | — |
| Raffinate fraction from column 1 | 18*) | — | 4.0 | — | — | — | — | — |
| Raffinate fraction from column 2, 3 or 4 | — | 5.0 | 8.0 | 5.0 | — | 25.0 | 0 | — |
| Betaine fraction | — | — | — | — | 26.0**) | — | — | — |
| Recycle fraction | 7.5 | — | — | — | — | — | — | — |
| Sucrose fraction | 13.5 | 8.5 | — | — | — | — | — | — |
| Recycled solution | — | — | — | — | 26.0 | 20.0 | 26.0***) | — |

*)Total from steps 1 and 2
**)Total from steps 4 and 5
***)Total from steps 7 and 8

TABLE 2

Compositions of feed and product fractions

| | Dry solids (kg/l) | Sucrose (% by weight on d.s.) | Betaine (% by weight on d.s.) | Other substances (% by weight on d.s.) |
|---|---|---|---|---|
| Molasses feed | 0.76 | 58.2 | 5.6 | 36.2 |
| Residue fraction | 0.075 | 21.2 | 7.5 | 71.3 |
| Betaine fraction | 0.028 | 10.1 | 41.4 | 48.5 |
| Sucrose fraction | 0.279 | 94.8 | 0.7 | 4.5 |

EXAMPLE 2

A pilot plant scale chromatographic test apparatus was employed. The apparatus included three columns, feed pumps, recycling pumps, eluant water pumps, flow and sequence was 100 minutes and the sucrose yield 87.3% (on the amount of sucrose fed).

Step 1: Molasses was fed into column 1 at flow rate 45 l/h, and residue was eluted from the same column (downstream end of the column); simultaneously water was supplied to column 2, and a recycling fraction and sucrose fraction were eluted from column 3 at a flow rate 85 l/h.

Step 2: Water was fed into column 2 at a rate 110 l/h, and the residue fraction was eluted from column 1; simultaneous recycling in column 3 at a rate 25 l/h.

Step 3: Recycling in columns 1 and 2 at a rate 110 l/h; simultaneously water was supplied to column 3 at a rate 35 l/h and the betaine fraction was eluted from the same column.

Step 4: Water was fed into column 1 at a rate 110 l/h and into column 3 at a rate 35 l/h, and the residue fraction was eluted from columns 2 and 3.

Step 5: Recycling in columns 1 and 2 at a rate 110 l/h and in column 3 at a rate 25 l/h.

After the sequence was completed, the process control program was continued and it returned to step 1. By repeating this sequence five to seven times, an equilibrium was reached in the system. The run was continued in a state of equilibrium, and product fractions with a constant composition were recovered and analyzed.

Table 3 shows the volumes of the feeds, recycled solution and product fractions, and Table 4 shows the compositions of molasses and the product fractions. Table 5 shows the colours of the molasses, residues and product fractions.

TABLE 3

Volumes of feeds, recycled liquid and product fractions (1)

| Step No. | 1 | 2 | 3 | 4 | 5 |
|---|---|---|---|---|---|
| Molasses feed | 18 | 5.0 | — | — | — |
| Water feed | 33.3 | 5.0 | 13.0 | 34.0 + 10.0 | — |
| Residue fraction from column 1 | 18 | 5.0 | — | — | — |
| Residue fraction from column 2 or 3 | — | — | — | 34.0 + 10.0 | — |
| Betaine fraction | — | — | 13.0 | — | — |
| Recycle fraction | 7.3 | — | — | — | — |
| Sucrose fraction | 26.0 | — | — | — | — |
| Recycled solution | — | 6.0 | 26.0 | — | 44.0 + 5.0 |

TABLE 4

Compositions of feed and product fractions

|  | Dry solids (kg/l) | Sucrose (% by weight on d.s.) | Betaine (% by weight on d.s.) | Other substances (% by weight on d.s.) |
|---|---|---|---|---|
| Molasses feed | 0.760 | 57.1 | 5.4 | 37.5 |
| Residue fraction | 0.069 | 18.7 | 6.8 | 74.5 |
| Betaine fraction | 0.048 | 5.3 | 47.5 | 47.2 |
| Sucrose fraction | 0.264 | 89.4 | 1.0 | 9.6 |

TABLE 5

Colours of molasses and product fractions

|  | colour ICUMSA | residue 1 | residue 2 | residue 3 |
|---|---|---|---|---|
| *Example 1* | | | | |
| Molasses | 47700 | | | |
| Residue | 115400 | 123600 | 151000 | 43324 |
| Betaine | 29900 | | | |
| Sucrose | 2100 | | | |
| *Example 2* | | | | |
| Molasses | 38250 | | | |
| Residue | 92500 | 136000 | 240600 | 25900 |
| Betaine | 21800 | | | |
| Sucrose | 4300 | | | |

EXAMPLE 3

Figure 3:
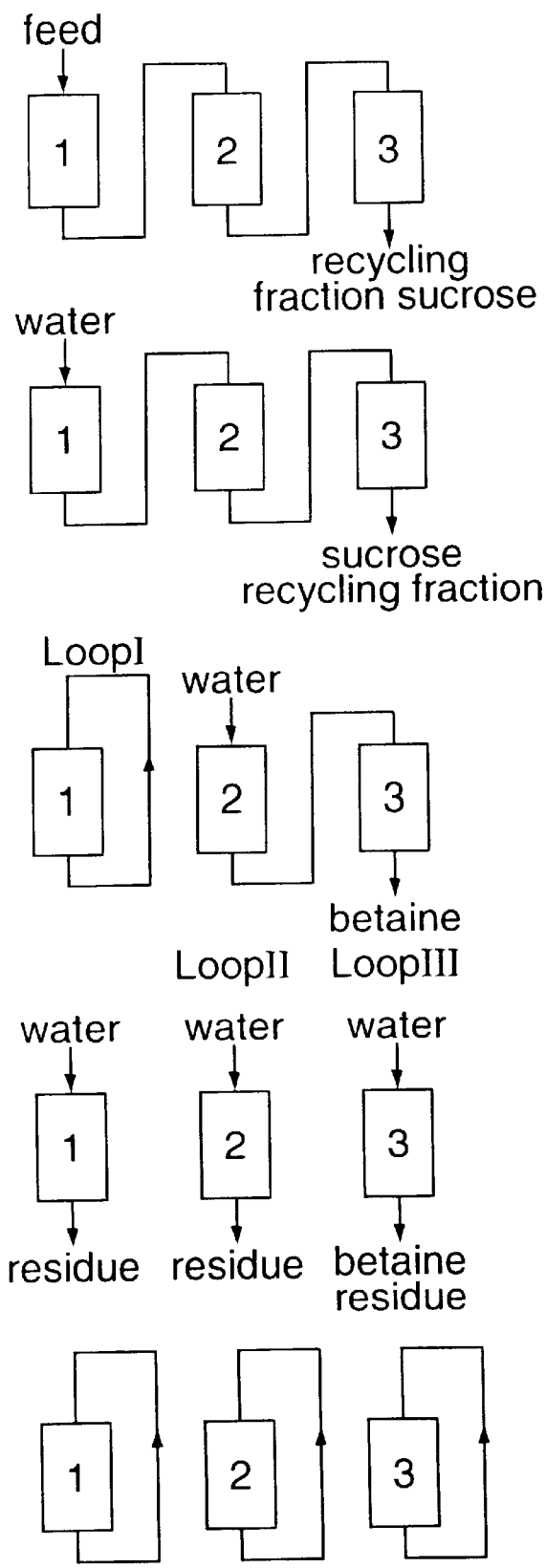
FIG. 3 shows a flow chart of the pilot plant of Example 3.

A pilot plant scale chromatographic test apparatus was employed. The apparatus included three columns, feed pumps, recycling pumps, eluant water pumps, flow and pressure regulators, and inlet and outlet valves for the different process streams. The flowchart is shown in FIG. 3.

The columns were packed with a strongly acid cation exchange resin ("Finex"). The resin had a polystyrene/divinylbenzene backbone and was activated with sulphonic acid groups; the mean spherule size was about 0.36 mm. The resin had a DVB content of 5.5%. Initially the resin had been regenerated to sodium form, and during the run it was balanced with cations from the feed molasses.

| Test conditions: | |
|---|---|
| Diameter of column | 200 mm |
| Height of resin bed: | |
| columns 1, 2 and 3 | 5000 mm |
| Temperature | 75° C. |
| Flow rates | 22, 35, 40, 45, 70, 75 l/h |

The feed solution consisted of beet molasses wherefrom calcium had been removed by adding sodium carbonate (pH 9) and filtering the precipitate off using diatomaceous earth as an aid.

The separation of sucrose and betaine was performed by a five-step sequence in which each column had its specific function. As shown in FIG. 3, step 3 comprises one recycling phase and step 5 three recycling phases. The duration of the sequence was 111 minutes and the sucrose yield 81.9% (on the amount of sucrose fed).

Step 1: Molasses was fed into column 1 at a flow rate 35 l/h, and the recycling fraction and sucrose fraction were eluted from column 3.

Step 2: Water was fed into column 1 at a flow rate 70 l/h and the sucrose and recycling fractions were eluted from column 3.

Step 3: Recycling in column 1 at a flow rate 70 l/h; simultaneously water was supplied to column 2 at a flow rate 40 l/h and the betaine fraction was eluted from column 3.

Step 4: Water was fed into columns 1, 2 and 3 at flow rates 70, 75 and 40 l/h, the residue fractions were eluted from columns 1, 2 and 3, and the elution of the betaine fraction was continues from column 3.

Step 5: Recycling in columns 1, 2 and 3 at flow rates 22, 75 and 45 l/h.

After the sequence was completed, the process control program was continued and it returned to step 1. By repeating this sequence five to seven times, an equilibrium was reached in the system. The run was continued in a state of equilibrium, and product fractions with a constant composition were recovered and analyzed.

Table 6 shows the volumes of the feeds, recycled solutions and product fractions, and Table 7 shows the compositions of the molasses and product fractions.

TABLE 6

Volumes of feeds, recycled liquid and product fractions (1)

| Step No. | 1 | 2 | 3 | 4 | 5 |
|---|---|---|---|---|---|
| Molasses feed | 20 | | | | |
| Water feed | | 20 | 10 | 20 + 26 + 20 | |
| Residue fraction | | | | | |
| from column 1 | | | | 26 | |
| from column 2 | | | | 26 | |
| from column 3 | | | | 15 | |
| Betaine fraction | | | 10 | 5 | |
| Recycle fraction | 9 | 4 | | | |
| Sucrose fraction | 11 | 16 | | | |
| Recycled solution | | | 8 | | 11 + 12 + 11 |

TABLE 7

Compositions of feed and product fractions

|  | Dry solids (kg/l) | Sucrose (% by weight on d.s.) | Betaine (% by weight on d.s.) | Other substances (% by weight on d.s.) |
| --- | --- | --- | --- | --- |
| Molasses feed | 0.754 | 59.6 | 5.6 | 34.8 |
| Residue fraction | 0.081 | 16.7 | 8.8 | 74.5 |
| Betaine fraction | 0.071 | 45.9 | 22.9 | 31.2 |
| Sucrose fraction | 0.252 | 92.7 | 0.7 | 6.6 |

What is claimed is:

1. A method for processing molasses selected from the group consisting of beet molasses, cane molasses, stillage, vinasse, wood molasses, wheat molasses, barley molasses, corn molasses, and solutions derived from any of the preceding, comprising:

recovering at least one product during processing of molasses in two or more loops, and each loop comprising one or more chromatographic beds, columns, or parts thereof separate and distinct from the other loop, said loops comprising at least a first loop and a second loop;

said processing comprising at least one of the following phases occurring sequentially or continuously in said two or more loops: a feeding phase and an eluting phase;

a recycling phase occurring sequentially or continuously in said two or more loops, wherein liquid present in each loop comprises a separate defined dry solids profile, and said dry solids profile is recycled during said recycling phase;

fractionating said molasses in said two or more loops by a chromatographic simulated moving bed process;

recovering at least two fractions from said first loop;

recovering at least two other fractions from said second loop; and wherein at least one of said fractions comprises a product fraction, said product fraction comprising a greater percentage concentration by weight on a dry solids basis of said product than said feed solution comprising said molasses, and said product fraction comprising a greater percentage concentration by weight on a dry substance basis of said product than said other fractions in said loops; and at least some of said phases during said processing of said molasses occurring sequentially or continuously.

2. A method as claimed in claim 1 wherein each loop comprises a series of columns containing a cation exchange resin.

3. A method as claimed in claim 1 wherein the chromatographic simulated moving bed process in said first loop is selected from the group consisting of a continuous simulated moving bed process and a sequential moving bed process.

4. A method as claimed in claim 1 wherein the chromatographic simulated moving bed process in said second loop is selected from the group consisting of a continuous simulated moving bed process and a sequential simulated moving bed process.

5. A method as claimed in claim 1 wherein said product fraction is recovered from said second loop.

6. A method as claimed in claim 1 wherein one of said fractions comprises a betaine fraction and said betaine fraction comprises a greater percentage concentration of betaine by weight on a dry solids basis than at least one of said other fractions in said loops.

7. A method as claimed in claim 1 wherein the processing in said first loop is different and distinct from processing in said second loop.

8. A method as claimed in claim 1 wherein said dry solids profile is recycled in all phases.

9. A method as claimed in claim 1 wherein the phases in said loops are the same or different.

10. A method as claimed in claim 1 wherein the loops are open or closed.

11. A method as claimed in claim 10 wherein a solution, liquid, or fraction from one loop is transferred or passed to another loop when the loops are open.

12. A method as claimed in claim 1 wherein each loop is different than the other loop.

13. A method for separating sucrose and betaine from a solution containing or derived from molasses in a chromatographic system, comprising:

establishing a flow of liquid from a solution containing or derived from molasses and eluent through a chromatographic system in a multi-step process in at least two loops, said multi-step process occurring sequentially or continuously, each step including at least one of the following phases: a feeding phase, an eluting phase and a recycling or circulation phase; operating at least two loops within the multi-step process so that the liquid present in each of the loops forms a separate dry solids profile and recovering sucrose and betaine during the multi-step process;

said loop including at least a first loop and a second loop, said first loop being upstream of said second loop, and each of said loops comprising at least one chromatographic bed, column, or part thereof which is separate and distinct from another loop; said method including chromatographically processing said liquid from a solution derived from molasses by a chromatographic simulated moving bed process in said loops;

eluting two fractions from said first loop;

eluting two other fractions from said second loop;

one of said fractions comprising a betaine fraction, said betaine fraction comprising a greater percentage concentration by weight on a dry solids basis of said betaine than said molasses; and one of said fractions comprising a sucrose fraction, said sucrose fraction comprising a greater percentage concentration by weight on a dry solids basis of said sucrose than said molasses, and said sucrose fraction comprising a greater percentage concentration by weight of sucrose than said other fractions in said loops.

14. A method as claimed in claim 13 wherein the simulated moving bed process in said first loop is selected from the group consisting of a continuous simulated moving bed process and a sequential moving bed process.

15. A method as claimed in claim 13 wherein the chromatographic simulated moving bed process in said second loop is selected from the group consisting of a continuous simulated moving bed process and a sequential simulated moving bed process.

16. A method as claimed in claim 15 wherein the loops are open or closed.

17. A method as claimed in claim 16 wherein a liquid or fraction from one loop is transferred or passed to another loop when the loops are open.

18. A method as claimed in claim 15 wherein said first loop is different than second loop.

19. A method as claimed in claim 15 wherein said betaine fraction comprises a greater concentration by weight of betaine than said other fractions in said loops.

20. A method for processing a feed solution derived from beet molasses, comprising:
chromatographically fractionating a solution derived from beet molasses in two or more loops in a multi-step process comprising at least two steps occurring sequentially, continuously, or simultaneously, said steps in said two or more loops comprising one or more of the following phases occurring sequentially, continuously, or simultaneously in each of said two or more loops: a feeding phase, an eluent water phase, a recycling phase, or a recovery phase of fractions;
flows conveying material from one loop to another during said feeding phase and said eluting phase;
at least two fractions being recovered from one of said loops during the recovery phase therein;
at least two other two other fractions being recovered from another of said loops during the recovery phase therein;
one of said fractions comprising a betaine fraction, said betaine fraction comprising a greater percentage concentration by weight on a dry solids basis of said betaine than said beet molasses, said betaine fraction comprising a greater concentration by weight on a dry solids basis of said betaine than some of said other fractions in said loops;
one of said fractions comprising a sucrose fraction, said sucrose fraction comprising a greater concentration by weight on a dry solids basis of sucrose than some of said other fractions in said loops;
each loop comprising a series of columns, beds, or parts thereof, one of said loops having at least one column, bed, or part thereof, separate and apart from said other loops; and
each loop having a separate dry solids profile.

21. A method as claimed in claim 20 wherein said sucrose fraction comprises a greater percentage concentration by weight on a dry solids basis of said sucrose than in said feed solution.

22. A method as claimed in claim 20 wherein the loops are open or closed.

23. A method as claimed in claim 22 wherein a stream, solution, liquid, or fraction from one loop is transferred or passed to another loop when the loops are open.

24. A method as claimed in claim 20 wherein said loops are different.

25. A method for the processing of molasses selected from the group consisting of beet molasses, cane molasses, stillage, vinasse wood molasses, wheat molasses, barley molasses, corn molasses, and solutions derived from any of the preceding, comprising:
eluting at least one product during processing of molasses in two or more loops in a system, each loop being different than the other loop, and each loop comprising one or more chromatographic beds, columns, or parts thereof separate and distinct from the other loop, said loops comprising at least a first loop and a second loop;
said processing comprising at least one of the following phases: a feeding phase and a recycling phase, wherein liquid present in each loop comprises a separate defined dry solids profile, and said dry solids profile is recycled in the recycling phase of the loop; said processing of molasses further including further comprising
eluting at least two fractions in said first loop by a chromatographic simulated moving bed process;
eluting at least two other fractions by chromatographic fractionation in a second loop;
conveying material from one loop to another loop; and wherein
at least one of said fractions comprises a product fraction, said product fraction comprising a greater percentage concentration by weight on a dry solids basis of said product than said molasses, and said product fraction comprising a greater percentage concentration by weight on a dry substance basis of said product than said other fractions in said loops.

26. A method as claimed in claim 25 wherein said processing in said first loop comprises at least one of a molasses feeding phase, a recycling phase, and a recovery phase of at least one product.

27. A method as claimed in claim 25 wherein said processing in said second loop includes one or more recycling phases, and a product recovery phase.

28. A method as claimed in claim 25 wherein the product is selected from the group consisting of sucrose and betaine.

29. A method as claimed in claim 25 wherein said processing comprises a plurality of recycling phases.

30. A method as claimed in claim 25 wherein said processing comprises five to ten steps or phases.

31. A method as claimed in claim 25 wherein said phases are repeated five to seven times in order to reach an equilibrium in the system, and the method is continued in the state of equilibrium reached.

32. A method as claimed in claim 25 wherein the system comprises three to twelve chromatographic beds.

33. A method as claimed in claim 25 wherein each loop comprises a series of columns containing a cation exchange resin.

34. A method as claimed in claim 25 wherein a strongly acid cation exchange resin comprises said beds.

35. A method as claimed in claim 34 wherein said strong cation exchange resin is in monovalent form.

36. A method as claimed in claim 35 wherein said monovalent form is selected from the group consisting of sodium, potassium and mixtures thereof.

37. A method as claimed in claim 25 wherein the flow rate of the liquid in the beds is 0.5–20 $m^3/h/m^2$.

38. A method as claimed in claim 25 wherein eluent water is used during said eluting and said eluent water ranges from about 40–95 degrees C.

39. A method as claimed in claim 25 wherein the molasses has a dry solids content is 20–80% by weight.

40. A method as claimed in claim 25 wherein the flow rate in the beds is 0.5–10 $m^3/h/m^2$.

41. A method as claimed in claim 25 wherein the molasses is 20% to 65% by weight dry solids.

42. A method as claimed in claim 25 wherein the system comprises three to six chromatographic beds.

43. A method as claimed in claim 25 wherein the temperature of the molasses is about 40 to 85 degrees C.

44. A method as claimed in claim 25 wherein the chromatographic simulated moving bed process in said first loop is selected from the group consisting of a continuous simulated moving bed process and a sequential moving bed process.

45. A method as claimed in claim 25 wherein the chromatographic fractionation in said second loop comprises a batch method.

46. A method as claimed in claim 25 wherein the chromatographic fractionation in said second loop is selected from the group consisting of a continuous simulated moving bed process and a sequential simulated moving bed process.

47. A method as claimed in claim 25 wherein said product fraction is recovered from said second loop.

48. A method as claimed in claim 25 wherein one of said fractions comprises a betaine fraction and said betaine fraction comprises a greater percentage concentration of betaine by weight on a dry solids basis than said other fractions in said loops.

49. A method as claimed in claim 25 wherein processing in said first loop is different than in to said second loop.

50. A method for separating sucrose and betaine from a liquid derived from molasses in a chromatographic system, comprising:

establishing a flow of liquid derived from molasses and eluent through a chromatographic system in a sequential or continuous process comprising at least one of the following phases: a feeding phase, and a recycling phase; liquid present in the recycling phase forms a separate dry solids profile; and recovering sucrose and betaine during the sequential or continuous process;

said loops including at least a first loop and a second loop, said first loop being connected to said second loop, said first loop being different than said second loop, and each of said loops comprising a different series of chromatographic beds, columns, or parts thereof; said method including flow through packing material beds effected between successive loops, the flow conveying material from one loop to another;

chromatographically processing liquid derived from molasses in said first and second loops by a chromatographic simulated moving bed process;

eluting at least part of one of said two fractions from said first loop;

eluting at least part of one of two other fractions in said second loop;

one of said fractions comprising a betaine fraction, said betaine fraction comprising a greater percentage concentration by weight on a dry solids basis of said betaine than said molasses, and said betaine fraction comprising a greater concentration by weight of betaine than said other fractions in said loops; and one of said fractions comprising a sucrose fraction, said sucrose fraction comprising a greater percentage concentration by weight on a dry solids basis of said sucrose than said liquid, and said sucrose fraction comprising a greater percentage concentration by weight of sucrose than said other fractions in said loops.

51. A method as claimed in claim 50 wherein one of said fractions is selected from the group consisting of a residue fraction and a raffinate fraction.

52. A method as claimed in claim 50 wherein the chromatographic simulated moving bed process in said first loop is selected from the group consisting of a continuous simulated moving bed process and a sequential moving bed process.

53. A method as claimed in claim 50 wherein the chromatographic simulated moving bed process in said second loop is selected from the group consisting of a continuous simulated moving bed process and a sequential simulated moving bed process.

54. A method for processing a feed solution derived from beet molasses, comprising:

chromatographically fractionating a feed solution comprising diluted beet molasses in a first loop into at least two fractions in a process comprising one or more phases occurring sequentially or continuously, said phases in said first loop comprising at least one of the following: a feeding phase in said first loop, an eluent water phase in said first loop, a recycling phase in said first loop, and a recovery phase of fractions in said first loop;

chromatographically fractionating at least one of said fractions from said first loop in a second loop into at least two other fractions by one or more phases occurring sequentially or continuously, said phases in said second loop comprising at least one of the following phases: a feeding phase in said second loop, an eluent water phase in said second loop, a recycling phase in said second loop, and a recovery phase of fractions in said second loop;

one of said fractions comprising a betaine fraction, said betaine fraction comprising a greater percentage concentration by weight on a dry solids basis of said betaine than said feed solution, said betaine fraction comprising a greater concentration by weight on a dry solids basis of said betaine than said molasses, and said betaine fraction comprising a greater concentration by weight of betaine than said other fractions in said loops;

one of said fractions comprising a sucrose fraction, said sucrose fraction comprising a greater percentage concentration by weight on a dry solids basis of said sucrose than said feed solution, said sucrose fraction comprising a greater concentration by weight on a dry solids basis of sucrose than said molasses, and said sucrose fraction comprising a greater concentration by weight on a dry solids basis of sucrose than other fractions in said loops;

each loop comprising a series of columns, beds, or parts thereof, said second loop having at least one column, bed, or part thereof, separate and apart from said first loop; and said first loop being different than said second loop;

flow through packing material beds effected between successive loops, the flow conveying material from loop to another; and each loop having a different dry solids profile.

55. A method as claimed in claim 54 wherein said chromatographically fractionating in each loop is selected from the group consisting of: a sequential chromatographic simulated moving bed process and a continuous chromatographic simulated moving bed process.

56. A method as claimed in claim 54 wherein one of said fractions is selected from the group consisting of a residue fraction and a raffinate fraction.

57. A method as claimed in claim 54 wherein said fraction said second loop is recycled.

58. A method as claimed in claim 54 wherein said sucrose fraction is recovered from said second loop.

59. A method as claimed in claim 54 wherein said betaine fraction is withdrawn from said second loop.

60. A method as claimed in claim 54 wherein said loops are selected from the group consisting of closed loops, open loops, and combinations thereof.

61. A method as claimed in claim 54 wherein said loops comprise successive loops.

62. A method as claimed in claim 54 wherein said columns comprise one or more partial packing material beds.

63. A method as claimed in claim 54 wherein during said process, said loops are in the same or different phases.

64. A method as claimed in claim 54 wherein said fraction from said first loop is fed to said second loop when said first and second loops are open.

65. A method as claimed in claim 54 wherein said bed comprises a cation exchange resin.

66. A method as claimed in claim 54 where said feed solution comprises 20%–65% beet molasses by weight on a dry solids basis.

67. A method as claimed in claim 66 wherein said feed solution is heated to 40–95 degrees C. before being fed to said first loop.

68. A method as claimed in claim 54 wherein there are three successive loops.

* * * * *